United States Patent Office 2,858,298
Patented Oct. 28, 1958

2,858,298

FLUID, CURABLE POLYALKYLENEETHER GLYCOL COMPOSITIONS AND CURED ELASTOMERS OBTAINED THEREFROM

James G. Burt, Oxford, Pa., assignor to E. I. du Pont de Nemours and Company, Wilmington, Del., a corporation of Delaware No Drawing. Application July 27, 1955
Serial No. 524,823

4 Claims. (Cl. 260—77.5)

This invention relates to elastomeric articles and more particularly to a process for the preparation of elastomeric articles from stable, fluid, polymeric compositions.

Heretofore, in the preparation of articles made from polymeric compositions, the processes used have often been cumbersome and wasteful due to the fact that the polymeric compositions had to be first cured and the particular articles then shaped from the cured polymers, or else the compounded solid polymers were first shaped into the desired articles by pressure and then cured. It would definitely be desirable to be able to prepare the elastomeric articles from a fluid, polymeric composition whereby it would be possible to form an elastomer directly in its ultimate shape merely by placing the fluid composition into any mold and heating to form and cure the elastomer.

It is an object of the present invention to provide stable, fluid polymeric compositions. A further object is to provide a process whereby these stable, fluid polymeric compositions can be used to prepare shaped elastomeric articles and can be cured to a valuable elastomer merely by the application of heat. Other objects will appear hereinafter.

These and other objects of the following invention are accomplished by preparing a stable, fluid polymeric composition comprising an intimate dispersion, without substantial chemical reaction, of 1,3 - bis(3 - isocyanato-p-tolyl)urea and a fluid, polymeric glycol composition having a molecular weight of at least 750 with the ratio of free isocyanate groups to free hydroxyl groups in said dispersion being greater than 1:1. This fluid dispersion may be readily poured into any desired shape or mold and may be formed into a cured elastomeric article merely by the application of heat.

The compound 1,3-bis(3-isocyanato-p-tolyl)urea may be prepared by the reaction of 2 molar parts of toluene-2,4-diisocyanate with 1 molar part of water, the reaction being carried out in an oxygen-containing solvent free from active hydrogen groups such as esters, ethers and ketones. U. S. Patent 2,757,185 more particularly describes and claims the compound 1,3-bis(3-isocyanato-p-tolyl)urea.

The polymeric glycols which are used in the present invention may be liquid polyalkyleneether glycols having molecular weights of at least 750. These glycols may be represented by the formula $HO(RO)_nH$, wherein R represents alkylene radicals which may be the same or different and $n$ is an integer sufficiently large so that the glycol has a molecular weight of at least 750. These glycols are sometimes known as polyalkylene glycols, polyalkyleneoxide glycols, polyglycols or polyoxyalkylene diols. These compounds are ordinarily derived from the polymerization of cyclic ethers, such as alkyleneoxides or dioxolane or by the condensation of glycols. Typical representative members of this class of glycols are polytetramethyleneether glycol, polytrimethyleneether glycol and polyethylene-methyleneether glycol. For purposes of the present invention, the polytetramethyleneether glycols are preferred. As stated above, it is necessary that these glycols have a molecular weight of at least 750 and this molecular weight may be as high as about 10,000.

In preparing the dispersions of 1,3-bis(3-isocyanato-p-tolyl) urea and a fluid polymeric glycol, it is not always necessary that polyalkyleneether glycol in itself be used. For example, a polyurethane glycol may be used. Also, a mixture of a polyalkyleneether glycol and an organic diisocyanate or an isocyanate-terminated polymer may be used provided there is a sufficient excess of polyalkyleneether glycol present for reaction with the organic diisocynate or isocyanate-terminated polymer. In this case, the polyalkyleneether glycol will react first with the organic diisocyanate, such as toluene-2,4-diisocyanate, or the isocyanate-terminated polymer to form a polyurethane glycol which will then subsequently react with the excess 1,3-bis(3-isocyanato-p-tolyl)urea upon the application of heat. The organic diisocyanates which may be used to form these other fluid polymeric glycol compositions may be of the aromatic, aliphatic or cycloaliphatic type. Representative compounds include toluene-2,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. In general, toluene-2,4-diisocyanate is preferred.

In preparing the compositions, it is essential that a very intimate mixture of 1,3-bis(3-isocyanato-p-tolyl)urea with the fluid polymeric glycol be formed and that the preparation should be carried out in the absence of moisture. In general, therefore, it is desirable that the 1,3-bis(3-isocyanato-p-tolyl)urea be very finely ground, such as by a micronizer or micropulverizer in order to offer the greatest surface for reaction. This mixture which contains a ratio of free isocyanate groups in the 1,3-bis(3-isocyanato-p-tolyl)urea to free hydroxyl groups in the polymeric glycol greater than 1:1, may then be mechanically worked, as for example on a three-roll ink mill to intimately disperse the 1,3-bis(3-isocyanato-p-tolyl)urea and form a mixture which is mechanically stable and from which the 1,3-bis(3-isocyanato-p-tolyl)urea will not readily settle out. This mixture is chemically stable at ordinary room temperatures. The 1,3-bis-(3-isocyanato-p-tolyl)urea is quite insoluble in the polyalkyleneether glycol and the free isocyanate groups on the 1,3-bis(3-isocyanato-p-tolyl)urea have reduced activity due to the presence of the methyl group. The 1,3-bis(3-isocyanato-p-tolyl)urea will not react at an appreciable rate with the active hydrogen on the hydroxyls of the polymeric glycol until the mixture is heated. It is, therefore, quite obvious that this mixture may be poured into any desired mold and reaction initiated to form a cured elastomeric article merely by the application of heat. In general, temperatures above about 75° C. are necessary to initiate the reaction.

The amount of 1,3 - bis(3-isocyanato-p-tolyl)urea which must be mixed with the polymeric glycol must be greater than the stoichiometric equivalent of the glycol, i. e., the ratio of free isocyanate groups to free hydroxyl groups must be greater than 1:1. With a ratio of 1:1, i. e., 1 mol of polymeric glycol to 1 mol of 1,3-bis(3-isocyanato-p-tolyl)urea, it is possible that infinite chain-extension will take place. For purposes of the present invention, it is considered that the excess of 1,3-bis(3-isocyanato-p-tolyl)urea over and above a 1:1 molar equivalence will act as a curing agent and this excess is expressed by the words "curing level." This curing level is the parts of 1,3-bis(3-isocyanato-p-tolyl)urea per 100 parts of infinitely extended or potentially infinitely extended polymer, i. e., the polymeric glycol extended with an equivalent amount of 1,3-bis(3-isocyanato-p-tolyl)urea. Thus a curing level of 6 means that there are 6 parts of 1,3-bis(3-isocyanato-p-tolyl)urea per 100 parts of polymer obtained from a polymeric glycol plus a stoichiometric equivalent of 1,3-bis(3-isocyanato-p-tolyl)urea.

The viscosity of the intimate dispersion may be controlled by suitable combination of the ingredients. However, generally, the fluidity of the polymeric glycol is controlling and an isocyanate-terminated polyurethane may be added to the polymeric glycol/1,3-bis(3-isocyanato-p-tolyl)urea dispersion to regulate the viscosity, provided the isocyanate content of the isocyanate-terminated polyurethane is less than the stoichiometric equivalent of the hydroxyl groups on the polymeric glycol. In this instance, the isocyanate-terminated polyurethane reacts with the polymeric glycol prior to the reaction of the 1,3-bis(3-isocyanato-p-tolyl)urea with the glycol and the viscosity increases accordingly. When heat is then applied, the 1,3-bis(3-isocyanato-p-tolyl)urea will react with the remaining hydroxyl groups of the formed polyurethane glycol so as to form the desired elastomer. It is quite obvious that since a stoichiometric excess of the 1,3-bis(3-isocyanato-p-tolyl)urea is being used, the excess over and above that which reacts with the polymeric glycol will act as a curing agent and cure the elastomeric product. This curing step most probably takes place by the reaction of the remaining free isocyanates with the active hydrogen atoms on the urea nitrogens of the elastomer.

The following examples will better illustrate the nature of the present invention; however, the invention is not intended to be limited to these examples. Parts are by weight unless otherwise indicated.

*Example 1*

100 parts of polytetramethyleneether glycol, having a molecular weight of 2810 and containing 0.128 weight percent water, and 21 parts of 1,3-bis(3-isocyanato-p-tolyl)urea, which is equivalent to a curing level of about 6, are compounded on a 3-roll ink mill to a uniform, finely dispersed, fluid composition. Part of this composition is poured into a compression mold and cured by heating under pressure for 30 minutes at 135° C. The resulting elastomer is allowed to stand under ordinary room conditions for four days and tested. It shows a tensile strength at the break of 4460 lbs. per square inch, a modulus at 300% elongation of 920 lbs. per square inch and an elongation at the break of 580%.

*Example 2*

To 100 parts of polytetramethyleneether glycol, having a molecular weight of 930 and containing 0.063 weight percent water, is added 12.5 parts of toluene-2,4-diisocyanate and the mass is stirred at 100–105° C. for 3 hours to give a polyurethane glycol of molecular weight 3130.

100 parts of the above prepared polyurethane glycol and 18.3 parts of 1,3-bis(3-isocyanato-p-tolyl)urea, which is equivalent to a curing level of about 6, are ground together on an ink mill. The fluid mass is poured into molds and cured in a press for 1.5 hours at 135° C. After standing several days, the elastomer shows the following properties at 25° C.:

Tensile strength at break_____lbs./sq. in__ 4100
Modulus at 300% elongation_____lbs./sq. in__ 775
Elongation at the break_____percent__ 640

*Example 3*

100 parts of polytetramethyleneether glycol, having a molecular weight of 2810 and containing 0.128 weight percent water, and 21 parts of 1,3-bis(3-isocyanato-p-tolyl)urea are milled together on an ink mill. The curing level here is about 6. Portions are then cured in molds in a press at varying times and temperatures as shown in the following table:

| Temperature, ° C. | Time, Hours | Modulus at 300% Elongation, Lbs./sq. in. |
| --- | --- | --- |
| 120 | 2.0 | 1,190 |
| 135 | 1.5 | 990 |
| 150 | 0.5 | 1,270 |

It is quite obvious that the cure is not too sensitive to temperature or time.

*Example 4*

Polytetramethyleneether glycol having a molecular weight of 2810 is milled on an ink mill with varying amounts of 1,3-bis(3-isocyanato-p-tolyl)urea and then cured in molds in a press for 2 hours at 120° C. The results are shown in the table below:

| Curing Level | Modulus at 300% Elongation, Lbs./sq. in. |
| --- | --- |
| 4 | 1,110 |
| 6 | 1,190 |
| 8 | 1,320 |
| 10 | 2,150 |

The modulus increases with increasing quantities of 1,3-bis(3-isocyanato-p-tolyl)urea as might be expected. A product heated as above with a zero curing level is solid but appears uncured; for example, it is soluble in organic solvents.

*Example 5*

25.6 parts of 1,3-bis(3-isocyanato-p-tolyl)urea and 100 parts of polytetramethyleneether glycol having a molecular weight of 995 are ground together to form a fine dispersion. To this is added with thorough mixing, 66 parts of an isocyanate-terminated polyurethane made by stirring 47.8 parts of polytetramethyleneether glycol of molecular weight 925 with 18.2 parts of toluene-2,4-diisocyanate for 4 hours at 50° C. This combination gives a curing level of approximately 5.

Part of the fluid mass is cast on glass plates at a thickness of 0.015 inch and heated in an oven at 150° C. without pressure, for 1.5 hours. There results a smooth, flawless, non-tacky film. It shows a tensile strength at the break of 3200 lbs. per square inch, an elongation at the break of 560% and a modulus at 300% elongation of 300 lbs. per square inch.

EXAMPLE 6

A polyurethane glycol is prepared by heating 248 parts of polytetramethyleneether glycol, having a molecular weight of 827, with 34.8 parts of toluene-2,4-diisocyanate for 3 hours at 100–105° C.

50 parts of this polyurethane glycol, 27.5 parts of 1,3-bis(3-isocyanato-p-tolyl)urea and 76 parts of polytetramethyleneether glycol, having a molecular weight of 995 and containing 2.0 mol percent water, are ground together to form a fine dispersion. To this is added 55 parts of the isocyanate-terminated polyurethane of Example 5 which is thoroughly mixed in. This mixture has a curing level of approximately 5. A film of 0.015 inch thickness is cured in an oven at 150° C. for 1.5 hours. The film is smooth, translucent, pale straw-yellow and flawless. It has a tensile strength at the break of 4875 lbs. per square inch, a modulus at 300% elongation of 500 lbs. per square inch, and an elongation at the break of 480%.

The fluid, curable compositions of this invention may be used to form a wide variety of elastomeric objects. For example, gaskets may be formed by pouring the fluid into forms and heating, with or without pressure.

Elastomeric bonds may be formed between articles by positioning the articles and filling the voids between with the fluid composition and heating. Centrifugal molding may be performed by flowing the composition into the spinning mold and then heating the mold. Intricate molds may be built and the fluid composition poured into them and then heated.

In addition, these fluid compositions may be used as coating compositions. They may be flowed or brushed over surfaces of various types, metal, wood, plastic, elastomeric, ceramic, textile fabrics, etc., and then heated to give tightly adherent coatings which are flexible, tough and scuff resisting.

The fluid, polymeric compositions of the present invention may be varied by suitable compounding. In general, the amount and type of compounding agent to be used is dependent upon the use for which the elastomer is intended. However, for purposes of the present invention, the compounding agents used should not contain active hydrogen atoms and after addition of the agents, the polymeric compositions must still be fluid. Typical compounding agents include carbon black, clay, silica, esterified silica particles, talc, zinc, etc. Inorganic and organic coloring agents may be used so as to give well defined colors.

As many widely different embodiments of this invention may be made without departing from the spirit and scope thereof, it is to be understood that this invention is not limited to the specific embodiments thereof except as defined in the appended claims.

What is claimed is:

1. A stable, fluid, curable polymeric composition comprising an intimate dispersion without substantial chemical reaction of (a) 1,3-bis(3-isocyanato-p-tolyl)urea and (b) a fluid plycol composition having a molecular weight of at least 750, said composition being selected from the group consisting of a polyalkyleneether glycol and a polyalkyleneether-polyurethane glycol, there being a ratio of free isocyanate groups on said 1,3-bis(3-isocyanato-p-tolyl)urea to free hydroxyl groups on said glycol composition greater than 1:1.

2. The composition of claim 1 wherein the fluid glycol composition is a polyalkyleneether glycol having a molecular weight of at least 750.

3. The composition of claim 2 wherein the polyalkyleneether glycol is a polytetramethyleneether glycol.

4. The composition of claim 1 wherein the fluid glycol composition is a polyurethane glycol prepared by the reaction of a molar excess of a polyalkyleneether glycol with an organic diisocyanate.

References Cited in the file of this patent

UNITED STATES PATENTS

| | | |
|---|---|---|
| 2,597,025 | Orth | May 20, 1952 |
| 2,692,873 | Langerak | Oct. 26, 1954 |
| 2,713,884 | Schwartz | July 26, 1955 |